March 18, 1947.  E. SCHUCHARDT  2,417,617
SLICING MACHINE
Filed July 6, 1945  2 Sheets-Sheet 1

Inventor
Ernest Schuchardt

By Clarence A. O'Brien
and Harvey B. Jacobson
Attorneys

March 18, 1947. E. SCHUCHARDT 2,417,617
SLICING MACHINE
Filed July 6, 1945 2 Sheets-Sheet 2

Inventor
Ernest Schuchardt

By
Clarence A. O'Brien
and Harvey B. Jacobson
Attorneys

Patented Mar. 18, 1947

2,417,617

UNITED STATES PATENT OFFICE 2,417,617

SLICING MACHINE

Ernest Schuchardt, Durham, N. C.

Application July 6, 1945, Serial No. 603,424

1 Claim. (Cl. 107—22)

The present invention relates to new and useful improvements in slicing machines, and more particularly to a machine of this character adapted for slicing, notching and splitting packages of frozen products, such as ice cream or the like.

An important object of the present invention is to provide a machine of this character embodying a holder for the product along which the product travels and providing a stationary knife in the path of the product to cut the wrapper longitudinally and also to provide a vertically movable rotary knife adapted to sever slices of predetermined widths from the end of the product.

A further object of the invention is to provide a pair of spaced parallel rotary knives, one of the knives being adapted to sever the end of the product, and the other of the knives being of relatively small diameter and positioned inwardly of the first-named knife, whereby to notch the product inwardly of the end thereof to function as a gauge for designating the thickness of the slice to be cut.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation, as more fully hereinafter described and claimed, reference being had to the accompanying drawings forming part hereof, wherein like numerals refer to like parts throughout, and in which:

Figure 2:
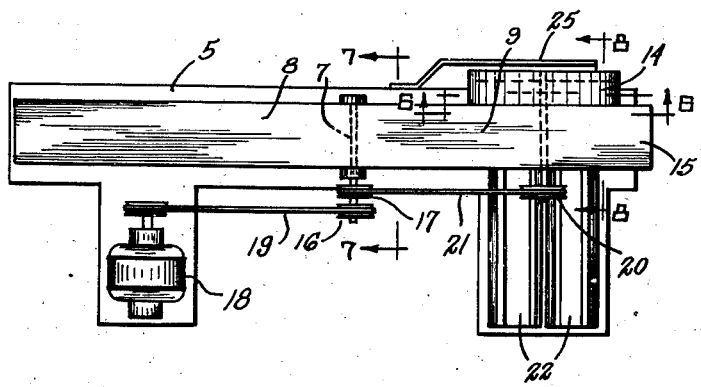
Figure 2 is a top plan view.
Figure 4:
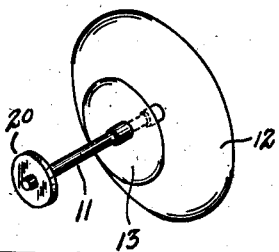
Figure 4 is a perspective view of the pair of rotary knives.
Figure 7:
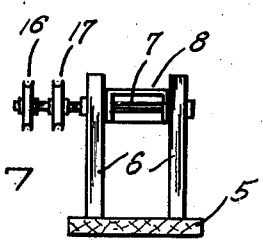
Figure 6:
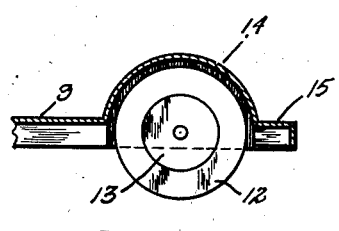
Figure 6 is a fragmentary sectional view taken substantially on a line 6—6 of Figure 2.
Figure 8:
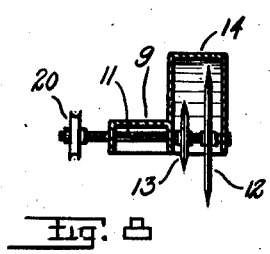

Figures 7 and 8 are transverse sectional views taken respectively on the lines 7—7 and 8—8 of Figure 2.

Referring now to the drawings in detail, wherein for the purpose of illustration I have disclosed a preferred embodiment of the invention, the numeral 5 designates an elongated supporting base for the apparatus and on which is mounted a pair of spaced parallel upstanding posts 6 having a shaft 7 journaled in the upper portions thereof and on which is pivotally mounted an arm 8 of inverted channel-shaped formation, the arm being pivoted adjacent one end to provide relatively short and long ends 9 and 10, respectively.

A shaft 11 is also journaled transversely of the short end 9 of the arm and on one end of which is secured a relatively large rotary cutter 12 and a relatively small rotary cutter 13, the cutters being mounted in spaced parallel relation on the shaft 11 with the smaller cutter 13 positioned inwardly of the larger cutter 12, as indicated in Figure 8 of the drawings.

A shield 14 is attached to the short end 9 of the arm for covering the upper portions of the cutters 12 and 13.

The short end of the arms 9 projects outwardly from the shaft 11 to provide a manipulating handle 15, and the longer end 10 of the arm provides a counterbalance for the arm to maintain the cutters in a raised position.

A pair of pulleys 16 and 17 are secured to the shaft 7, the pulley 16 being driven from an electric motor 18 by means of a belt 19 and the pulley 17 drives a pulley 20 secured to the shaft 11 through a belt 21 for rotating the cutters 12 and 13.

Figure 3:
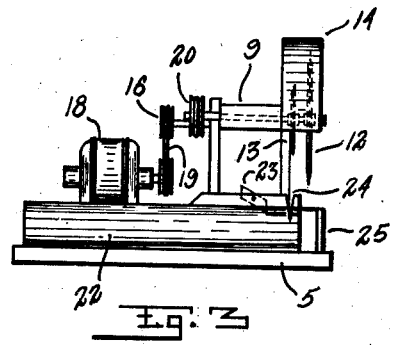
Figure 3 is a front end elevational view.
Figure 5:
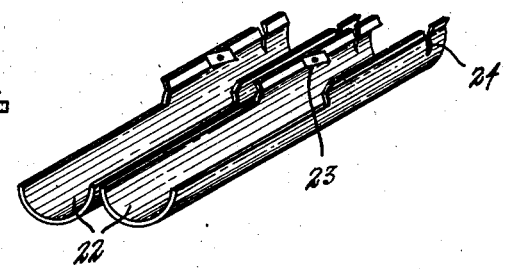
Figure 5 is a perspective view of a pair of the holders for the product raised in side-by-side relation, and in each of which the product is fed for simultaneous cutting by the knives.

A pair of channel-shaped or semi-cylindrical holders 22 are supported in side-by-side relation transversely of the base 5 at the end thereof adjacent the cutters 12 and 13, one end of the holders terminating on a vertical plane between the cutters 12 and 13, as indicated in Figure 3 of the drawings.

The holders 22 are adapted to receive packaged ice cream or similar frozen products in tubular form for movement along the holders toward the cutters.

To one of the upper edges of each of the holders 22 is attached a longitudinally extending downwardly inclined blade 23 by means of a bolt 24 to support the blades in a position for cutting the wrapper of the product longitudinally as the product is moved along the holders toward the end thereof adjacent the cutters 12 and 13.

The upper edges of the holders 22 adjacent the cutters are formed with transverse notches 24 adapted to receive the smaller cutter 13 to partially cut into the upper surface of the product transversely thereof and inwardly of its end. At the same time, the larger cutter 12 severs the end of the product which projects outwardly from the adjacent ends of the holders 22 in a manner as will be apparent.

A stop 25 for the severed product is attached at one end to the base 5 and extends transversely across the front ends of the holders 22 in outwardly spaced relation therefrom.

Figure 1:
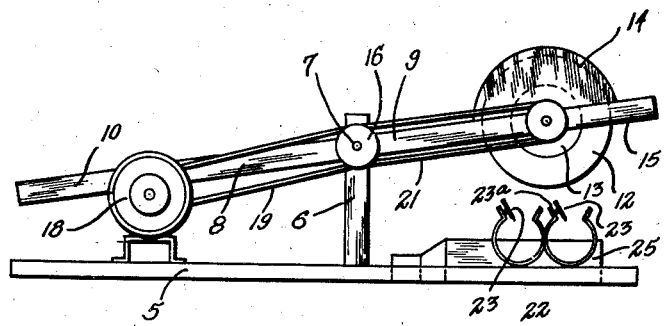
Figure 1 is a side elevational view.

In the operation of the device, the arm 8 is normally held in its balanced position, as shown in Figure 1, and the wrapped cylinders of ice cream or other frozen products are placed in the holders 22 and moved toward the longitudinal knives 23 which split the wrappers.

The end of the ice cream is moved forwardly to the end of the holders 22 and the cutters lowered by the handle 15 so that the smaller cutter 13 will partially cut the end of the ice cream to gauge the width of the slice to be cut therefrom and the ice cream is then moved forwardly until the notch cut therein by the small cutter 13 is aligned with the ends of the holders 22, whereupon the large cutter 12 will cut a slice from the ice cream of predetermined thickness.

In view of the foregoing description taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claim.

Having thus described the invention, what I claim is:

In a slicing machine, a trough shaped holder rigidly mounted in horizontal position and adapted to receive therein elongated material to be shoved along the same for cutting off sections thereof at one end of the holder, said holder having a pair of side edge notches therein adjacent said end of the same aligned transversely of the holder, an arm above said holder extending transversely of the same and pivotally mounted for downward swinging of one end thereof toward said holder, a counterweight on said arm overbalancing the same to swing said end thereof upwardly, and a pair of relatively large and small rotary cutters on said end of the arm, the smaller cutter lying in a common plane with said pair of notches and being swingable downwardly by said arm into said notches to mark off sections of the material to be cut, the larger cutter lying in a plane offset outwardly from said end of said holder and being swingable downwardly by said arm to cut off the material at said end of the holder when the material is shoved along the holder to vertically align the marks on said material with said larger cutter, and power means to rotate said cutters simultaneously.

ERNEST SCHUCHARDT.

REFERENCES CITED

The following references are of record in the file of this patent:

UNITED STATES PATENTS

| Number | Name | Date |
|---|---|---|
| 645,862 | Letson et al. | Mar. 20, 1900 |
| 952,819 | Kress | Mar. 22, 1910 |
| 1,944,577 | Rose | Jan. 23, 1934 |
| 2,207,938 | Newman et al. | July 16, 1940 |
| 2,225,106 | Franke | Dec. 17, 1940 |
| 1,907,620 | Van Berkel | May 9, 1933 |